United States Patent
Sugimoto et al.

(10) Patent No.: US 7,288,141 B2
(45) Date of Patent: Oct. 30, 2007

(54) WATER BASE INK SET FOR INK-JET RECORDING

(75) Inventors: Junichiro Sugimoto, Aichi-gun (JP); Masaya Fujioka, Nagoya (JP); Kazuma Goto, Nagoya (JP); Narumi Koga, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 263 days.

(21) Appl. No.: 11/217,456

(22) Filed: Sep. 2, 2005

(65) Prior Publication Data

US 2006/0048672 A1 Mar. 9, 2006

(30) Foreign Application Priority Data

Sep. 3, 2004 (JP) .............................. 2004-256556

(51) Int. Cl.
*C09D 11/00* (2006.01)
*C09D 11/02* (2006.01)

(52) U.S. Cl. .............................. 106/31.27; 106/31.28; 106/31.6

(58) Field of Classification Search ............. 106/31.27, 106/31.28, 31.6

See application file for complete search history.

(56) References Cited

U.S. PATENT DOCUMENTS

| 5,560,771 | A | 10/1996 | Takemoto et al. ........ 106/31.49 |
| 5,745,140 | A | 4/1998 | Stoffel et al. ................ 347/100 |
| 6,386,695 | B1 | 5/2002 | Kowalski .................... 347/100 |
| 6,631,974 | B2 | 10/2003 | Shindo ......................... 347/33 |
| 2005/0235868 | A1* | 10/2005 | Goto et al. .............. 106/31.27 |
| 2006/0119681 | A1* | 6/2006 | Sugimoto et al. .......... 347/100 |
| 2006/0268084 | A1* | 11/2006 | Nishizaki et al. ........... 347/100 |

FOREIGN PATENT DOCUMENTS

| JP | B 3089665 | 7/2000 |
| JP | A 2002-173623 | 6/2002 |
| JP | A 2002-234151 | 8/2002 |

* cited by examiner

*Primary Examiner*—Helene Klemanski
(74) *Attorney, Agent, or Firm*—Oliff & Berridge, PLC

(57) ABSTRACT

In a water base ink set for ink-jet recording including a pigment-based black ink and a dye-based yellow ink, a first water-soluble dye in which a number of counter ion or ions per one molecule is not more than 3 and a hue angle h* is 95° to 105° is used, as the dye used in the yellow ink, together with a second water-soluble dye in which a number of counter ion or ions per one molecule is not more than 3 and a hue angle h* is 75° to 85°; or 30° to 70°; or 0° to 30° or 350° to 360°. When the ink set is applied to a general ink-jet printer with a simple maintenance system, the coagulation of black pigment in the printer and the blurring or bleeding on the printing paper are prevented, thereby realizing a satisfactory and complex coloring of the dye-based yellow ink.

11 Claims, 3 Drawing Sheets

WATER BASE INK SET FOR INK-JET RECORDING

BACKGROUND OF THE INVENTION

1. Field of the Invention

The present invention relates to a water base ink set for ink-jet recording which includes a pigment-based black ink containing a self-dispersible black pigment and a dye-based yellow ink containing a water-soluble yellow dye. More specifically, the present invention relates to a water base ink set for ink-jet recording which is suitable for the use in an ink-jet printer mounted with a piezoelectric ink-jet printing head, especially with a piezoelectric ink-jet printing head manufactured by stacking sheets each having a ink channel formed therein.

2. Description of the Related Art

As a water base ink used in the ink-jet recording system, dye-based inks containing a water-soluble dye which hardly causes deposition and is excellent in handling performance as a coloring agent have been hitherto widely used. The dye-based ink, however, has a disadvantage such that the phenomenon of the blurring, which causes the edge of an image area or a line area to become jaggy, is likely to occur because the dye-based ink is prone to irregularly spread along the surface of a recording paper when the ink permeates into the paper. As a result, it is difficult to obtain an image area or a line area with sharp edge.

In order to suppress the blurring and to obtain an image area or a line area with sharp edge, a pigment-based ink using, as a coloring agent, a pigment which disperses as minute particles in the ink has been used as the water base ink for ink-jet recording for the following reason. It is considered that, unlike the water-soluble dye dissolved in an ink solvent medium, the pigment is not dissolved in the ink solvent medium and does not behave in the same manner as the ink solvent medium. Accordingly, the pigment particles in the pigment ink are prohibited from moving (permeating) by, for example, the additives and fibers contained in the recording paper. Therefore, the amount of the pigment particles remained on the paper surface is increased.

Although the pigment-based ink has these characteristics, there is a problem associated with the pigment-based ink such that the vividness or brightness of a printed article is deteriorated because light is diffusely reflected by the pigment particles on the surface and in the inside of the paper on which the ink-jet recording has been performed. On the other hand, although the dye-based ink has the problem as described above, the dye-based ink is advantageous in obtaining printed article with vivid or bright color because the dye is dissolved in the ink at the molecular level, and thus a dye molecule absorbs light with a wavelength characteristic to the dye molecule without diffusely reflecting the light on the surface and in the inside of the paper.

In view of this situation, an ink set has been devised in U.S. Pat. No. 5,745,140 in which a pigment-based black ink using a black pigment such as carbon black as the coloring agent and a dye-based color ink using a dye as the coloring agent are used in combination. When such an ink set is used, for example, text data is printed with the pigment-based black ink and graphic data is printed with the dye-based color ink. Accordingly, it is possible to form not only letters excellent in visibility (visual. recognition performance) and with sharp edges and high contrast but also color images with vivid colors.

The pigments used in the pigment-based ink are generally classified into the following two types by the way the pigments are dispersed in the water. One type is a dispersing agent-aided dispersion pigment with which a dispersant agent such as a surfactant and a resin selected in accordance with the intended use for the ink is used. The other type is a self-dispersible pigment in which a surface oxidation treatment, a chemical bonding treatment or the like is applied to the particles of the pigment such as carbon black so that the pigment particles can be dispersed in the water by themselves. In general, the self-dispersible pigment is widely used for having the following advantages. As compared with the dispersing agent-aided dispersion pigment, the dispersion state in the self-dispersible pigment is hardly deteriorated even when co-existing with components necessary for the water base ink for ink-jet recording such as a moistening agent, a permeating agent, a surfactant and other additives, thereby realizing an increased freedom (flexibility) in the ink composition. On the other hand, the self-dispersible pigment, in which the dispersion stability relies only on the electrostatic repulsive force, has a problem such that the dispersion of the self-dispersible pigment is likely to become unstable when the pigment co-exists with salts.

Accordingly, in an ink-jet printer which is mounted with an ink set for ink-jet recording including the above-described pigment-based ink and dye-based ink, when the self-dispersible pigment which is negatively charged in the ink is used as the pigment and a general anionic dye is used as the dye, there may arise the following problem. When the pigment-based ink and the dye-based ink contact with each other or mix with each other, the negative charge of a pigment particle is canceled by the positive charge of a counter ion of the anionic dye, the electric repulsive force of the pigment is lost and the dispersion is destabilized, which results in the aggregation of pigment in some cases. In addition that the dispersion state of the pigment is destabilized due to the lowered electrostatic repulsive force as described above, the aggregation of the pigment may also occur in other cases due to a solvent shock which is caused when the pigment ink and the dye color ink contact with each other, thereby destabilizing the dispersion of the pigment.

Further, when an image is formed on the recording paper with such a water base ink set for ink-jet recording, the problem of the bleeding also occurs. The bleeding refers to such a phenomenon that the printing quality deteriorates at a portion (hereinafter referred to also as a boundary portion), in which different colors are adjacent to each other, because the inks having different colors are mixed with each other at the portion. In particular, the bleeding between a pigment-based black ink and a dye-based yellow ink is a serious problem since these inks greatly differ from each other in lightness and darkness or contrasting density.

As the attempt for solving the problem of bleeding in such a water base ink set for ink-jet recording, a method is devised in which a first electric charge (anionic or cationic) is applied to a black ink, and a second electric charge (cationic or anionic), which is opposite to the first electric charge, to a color ink to be used in combination with the black ink (U.S. Pat. No. 6,386,695 corresponding to Japanese Patent Application Laid-open No. 2002-173623). In this method, the black pigment particles contained in the black ink are intentionally made to aggregate on the paper surface when the black and color inks contact with each other, thereby momentarily preventing the pigment in the black ink from moving off a border with the color ink. As a result, a good anti-bleeding quality is obtained. Accordingly, it is expected to suppress the bleeding by applying this method to the pigment-based black ink and the dye-based yellow ink.

However, even when the bleeding can be suppressed on the surface of recording paper, the aggregation of the pigment still occurs in a nozzle head surface or the like of an ink-jet printer when the pigment-based black ink and the dye-based yellow ink make contact or mix with each other in the nozzle head surface. Accordingly, when such an ink set for ink-jet recording including the pigment-based black ink and the dye-based yellow ink as described above is applied to a generally used conventional ink-jet printer, various inconveniences are expected to occur.

For example, such a generally used conventional ink-jet printer is disclosed in U.S. Pat. No. 6,631,974 B2 corresponding to Japanese Patent Application Laid-open No. 2002-234151. This ink-jet printer has a simple maintenance structure in which nozzles for different colors in a printing head are collectively wiped. Accordingly, in this printer, the nozzle arrays, which are arranged in the printing head to discharge inks of two colors respectively, are disposed extremely close to one another. Therefore, it is impossible to divide, for each of the colors, the suction cap for sucking and purging the inks in the printing head. In this structure, the nozzles arrays for the inks of two colors such as a pigment-based black ink and a dye-based yellow ink are collectively covered with the suction cap. Therefore, the inks of two colors, which are simultaneously sucked by the aid of the suction cap, are mixed with each other in the suction cap, delivered to the suction pump through a tube, and then discharged to a drain tank by the aid of the suction pump. Therefore, when this simple maintenance system is adopted in the printer, the cost of the printer can be suppressed but the following problems arise. When the wiping is performed in this printer, the pigment-based black ink and the dye-based yellow ink are mixed with each other in the nozzle surface of the printing head, the wiper and the suction cap; and the mixed ink adheres to or firmly fixes to the nozzle surface of the printing head, the wiper and the suction cap. In addition, the pigment-based black ink and the dye-based yellow ink are mixed with each other also in the suction cap, a tube connecting respective members, the pump, and the drain tank; and the mixed ink adheres to or firmly fixes to the inside of these parts. The pigment are aggregated in the mixed ink, and the aggregated pigment causes the clog-up of nozzle of the printing head; and the aggregated pigment adheres or firmly fixes to the surrounding of nozzle, thereby damaging a repellent ink coat, which in turn causes the discharge failure and the degradation of printing quality. In addition, the aggregated pigment adheres or firmly fixes to the wiper, thereby causing non-uniform wiping operation; the aggregated pigment adheres or firmly fixes to the suction cap to lower the airtightness; the aggregated pigment adheres to and firmly fixes to the inside of the suction pump, thereby causing the operational failure of the pump or the like. As a result, the reliability of maintenance is lowered.

In order to suppress these inconveniences, it is necessary to elaborate the constitution of the printer itself in which the ink set is used. For this purpose, countermeasures are conceivable such that providing a plurality of wipers for the pigment-based black ink and the dye-based yellow ink respectively to prevent these inks from mixing with each other in the surrounding of the nozzles; separating the printing head into a head for the pigment-based black ink and a head for the dye-based yellow ink; and separating the maintenance system into a maintenance system for the pigment-based black ink and a maintenance system for the dye-based yellow ink. However, these countermeasures to elaborate the structure of the printer has problems such that the structure of the printer becomes complicated and the cost for manufacturing the printer is increased. Therefore, it has been practically difficult to provide a water base ink set for ink-jet recording including a pigment-based black ink and a dye-based yellow ink in a generally used conventional ink-jet printer of the low-cost type.

Further, there is a demand for a dye-based yellow ink, on the premise to be used in combination with a pigment-based black ink, namely the dye-based yellow ink capable of expressing a tint of complex yellow such as a greenish yellow, an orangey yellow, a reddish yellow or the like, rather than a tint of a simple yellow. The use of a single yellow dye, however, is not capable of achieving this objective under the present circumstances.

In connection with this demand, as the yellow dye for yellow ink having a satisfactory color reproduction property, it has been devised to use Color Index (hereinafter abbreviated as "C. I.") Direct Yellow 86 and C.I. Direct Yellow 132 in combination (U.S. Pat. No. 5,560,771 corresponding to Japanese Patent No. 3089665). There is, however, a problem that the aggregation of pigment-based black ink cannot be suppressed, even when it is possible to obtain a yellow ink having a satisfactory yellow coloring with complex yellow tint, rather than the tint of simple, by using C. I. Direct Yellow 86 and C.I. Direct Yellow 132 in combination.

SUMMARY OF THE INVENTION

The present invention has been made in order to satisfy the problems as described above, an object of which is to realize an ink-jet recording which has a high and stable printing quality with low cost and high reliability and in which the inconvenience due to the aggregation of black pigment in the printer is prevented, the occurrence of blurring and/or bleeding is prevented in the recorded article and satisfactory coloring and complex yellow tint are realized in a dye-based yellow ink, when a water base ink set for ink-jet recording which includes a pigment-based black ink containing a self-dispersible black pigment and a dye-based yellow ink is applied to a general ink-jet printer having a simple maintenance system.

Upon selecting at least two kinds of water-soluble dye for a dye-based yellow ink to be used together with a pigment-based black ink containing a self-dispersible black pigment, the inventors first focused attention to the number of counter ions in a water-soluble dye in the yellow ink, in view of the fact that the aggregation of the self-dispersible black pigment is affected by the amount of ions in the ink, and discovered that when the number of counter ion per one molecule in the water-soluble dye exceeds a predetermined number, the function to aggregate the self-dispersible black pigment becomes stronger. Then, the inventors discovered that, upon selecting a yellow dye in which a number of counter ions is not more than a predetermined value so as to prevent the aggregation of the pigment contained in the pigment-based black ink, there are no conventional yellow dyes capable of expressing a desired complex yellow tint in the dye-based yellow ink. Accordingly, the inventors focused attention to the hue angle h* of the water-soluble dye and discovered that a yellow color with satisfactory coloring and complex tint can be realized by using a water-soluble dye having a hue angle h within a range of 95° to 105° together with another dye having a different hue angle h* from that of the water-soluble dye. Based on these discoveries, the inventors completed the present ink set in which the above objective is achieved, namely an ink set containing a yellow dye which prevents the aggregation of black pigment and has a desired yellow tint.

According to a first aspect of the present invention, there is provided a water base ink set for ink-jet recording comprising: a pigment-based black ink containing water, a self-dispersible black pigment, and a water-soluble solvent; and a dye-based yellow ink containing water, a first water-soluble dye in which a number of counter ion or ions per one molecule is not more than 3 and a hue angle h* is 95° to 105°, and a second water-soluble dye in which a number of counter ion or ions per one molecule is not more than 3 and a hue angle h* is 75° to 85°, wherein a weight ratio of the second water-soluble dye to the first water-soluble dye in the dye-based yellow ink is 10.0 to 100.0%; and a total content of the first and second water-soluble dyes in the dye-based yellow ink is 1.8 to 5.5% by weight.

According to a second aspect of the present invention, there is provided a water base ink set for ink-jet recording comprising: a pigment-based black ink containing water, a self-dispersible black pigment, and a water-soluble solvent; and a dye-based yellow ink containing water, a first water-soluble dye in which a number of counter ion or ions per one molecule is not more than 3 and a hue angle h* is 95° to 105°, and a second water-soluble dye in which a number of counter ion or ions per one molecule is not more than 3 and a hue angle h* is 30° to 70°, wherein a weight ratio of the second water-soluble dye to the first water-soluble dye in the dye-based yellow ink is 0.8 to 5.5%; and a total content of the first and second water-soluble dyes in the dye-based yellow ink is 1.8 to 5.5% by weight.

According to a third aspect of the present invention, there is provided a water base ink set for ink-jet recording comprising: a pigment-based black ink containing water, a self-dispersible black pigment, and a water-soluble solvent; and a dye-based yellow ink containing water, a first water-soluble dye in which a number of counter ion or ions per one molecule is not more than 3 and a hue angle h* is 95° to 105°, and a second water-soluble dye in which a number of counter ion or ions per one molecule is not more than 3 and a hue angle h* is 0° to 30° or 350° to 360°, wherein a weight ratio of the second water-soluble dye to the first water-soluble dye in the dye-based yellow ink is 0.3 to 3.5%; and a total content of the first and second water-soluble dyes in the dye-based yellow ink is 1.8 to 5.5% by weight.

In the water base ink set for ink-jet recording of the present invention, a water soluble dye having a number of counter ion or ions per one molecule is not more than 3 is used as the coloring agent for the dye-based yellow ink. Accordingly, even when the pigment-based black ink containing a self-dispersible black pigment contacts with the dye-based yellow ink, the aggregation of the self-dispersible black pigment dispersed in the pigment-based black ink is suppressed. Thus, it is possible to solve the problems such as the clog-up of the nozzle and the operational failure of the suction pump for maintenance which would be otherwise caused by the aggregation. Therefore, the ink set for ink-jet recording of the present invention is capable of concurrently satisfying the stable printing quality, the high printing quality and the high printing reliability.

In the first to third aspects of the present invention, a first water-soluble dye in which a number of counter ion or ions per one molecule is not more than 3 and a hue angle h* is 95° to 105° is contained in the dye-based yellow ink. Although the number of counter ion or ions per one molecule is not more than 3 in the first water-soluble dye, the tint of the first water-soluble dye is greenish yellow. Therefore, the coloring of the yellow ink cannot be sufficiently satisfied by using the first water-soluble dye singly. Accordingly, in the present invention, the first water-soluble dye is contained in the dye-based ink in combination with i) a second water-soluble dye which has a tint of bright yellow and in which a hue angle h* is 75° to 85°, or ii) a second water-soluble dye which has a tint of orange and in which a hue angle h* is 30° to 70°, or iii) a second water-soluble dye which has a tint of red and in which a hue angle h* is 0° to 30° or 350° to 360°. This makes it possible to sufficiently satisfy the coloring of the yellow ink as well. In addition, the purchasing cost for the black pigment and these water-soluble dyes is relatively low.

According to a fourth aspect of the present invention, there is provided a water base ink set for ink-jet recording comprising: a pigment-based black ink containing water, a self-dispersible black pigment, and a water-soluble solvent; and a dye-based yellow ink containing water, a first water-soluble dye in which a number of counter ion or ions per one molecule is not more than 3, and a second water-soluble dye in which a number of counter ion or ions per one molecule is not more than 3 and which has a hue angle h* different from a hue angle h* of the first water-soluble dye by not less than 50°, wherein a weight ratio of the second water-soluble dye to the first water-soluble dye in the dye-based yellow ink is 0.3 to 5.5%; and a total content of the first and second water-soluble dyes in the dye-based yellow ink is 1.8 to 5.5% by weight.

The ink set according to the fourth aspect of the present invention has the following effect in addition to the effects obtained by the first to third aspects of the present invention. The inventors discovered the following remarkable effect that, for the purpose of obtaining an yellow ink having a desired hue, when a first water-soluble dye having a certain hue angle h* is used in combination with a water-soluble dye having a hue angle h* apart from the certain hue angle h* of the first water-soluble dye (for example, a water-soluble dye having a hue angle h* different from that of the first water-soluble dye by not less than 50°) as in the dye-based ink of the ink set of the fourth aspect, a total blending amount of the water-soluble dyes can be less than a total blending amount in a case in which the first water-soluble dye having the certain hue angle h* is used in combination with a water-soluble dye having a hue angle h* which is near to the certain hue angle h of the first water-soluble dye. As the total blending amount of the water-soluble dyes in the dye-based yellow ink decreases, the amount of counter ion or ions per one molecule, i.e. the amount of charge of the entire dye-based ink, also decreases, thereby further effectively preventing the aggregation of the pigment-based black ink.

In the water-base ink set for ink-jet, recording of the fourth aspect of the present invention, the hue angle h* in the first water-soluble dye may be 95° to 105°. Also, in the dye-based yellow ink of this ink set, the hue angle h* of the second water-soluble dye may be different from that of the first water-soluble dye by not less than 90°, and the weight ratio of the second water-soluble dye to the first water-soluble dye may be 0.3 to 3.5%.

The inventors discovered that coloring as the dye-based yellow ink is satisfactory when a value of a lightness L* is $84 \leq L^* \leq 90$ and a value of the hue angle h* is $85° \leq h^* \leq 95°$ in the dye-based yellow ink. A printed article printed with a yellow ink is evaluated to have satisfactory coloring as the yellow color when a value of a lightness L* is $84 \leq L^* \leq 90$ and a value of the hue angle h* is $85° \leq h^* \leq 95°$ in the printed article. In the present invention, for the purpose of obtaining a yellow ink especially having such a hue angle h*, the first and second water-soluble dyes are combined in accordance with the present invention.

According to each of the water base ink sets for ink-jet recording of the first to fourth aspects of the present invention, when the ink set for ink-jet recording, which includes the dye-based yellow ink and the pigment-based black ink containing the self-dispersible black pigment, is applied to a general ink-jet printer having a simple maintenance system, it is possible to prevent the inconvenience due to the aggregation of black pigment in the printer; to prevent the occurrence of blurring and/or bleeding in the recorded article; to realize a dye-based yellow ink with satisfactory coloring and complex yellow tint; and to realize an ink-jet recording having a high and stable printing quality with low cost and high reliability.

DESCRIPTION OF THE PREFERRED EMBODIMENTS

The water base ink set for ink-jet recording of the present invention includes a pigment-based black ink and a dye-based yellow ink. The present invention will be explained in reference to drawings.

The pigment-based black ink includes water, a self-dispersible black pigment, and a water-soluble solvent. The self-dispersible black pigment has an advantage such that the dispersion state is hardly deteriorated even when co-existing with components necessary for the water base ink for ink-jet recording such as a moistening agent, a permeating agent, a surfactant and other additives, thereby realizing an increased freedom (flexibility) in the ink composition. On the other hand, the self-dispersible black pigment, in which the dispersion stability relies only on the electrostatic repulsive force, has a disadvantage such that the dispersion of the self-dispersible pigment is likely to become unstable when the pigment co-exists with counter ions of the water-soluble dye used in the dye-based yellow ink. Based on the results of the diligent experiments, the inventors uses or selects, as the water-soluble dye to be contained in the dye-based yellow ink, a water-soluble dye in which a number of counter ion or ions is not more than 3. Accordingly, it is possible to suppress the occurrence of aggregation of the pigment in the pigment-based black ink when the black ink contacts with the dye-based yellow ink having a dye concentration which causes no problems in practical use.

In the dye-based inks of the first to third aspects of the present invention, a first water-soluble dye which has a tint of greenish yellow and in which a hue angle h* is 95° to 105° is used as the water-soluble dye in which a number of counter ion or ions per one molecule is not more than 3 and which is used for the dye-based yellow ink. Further, in the dye-based yellow ink of the present invention, (1) a second water-soluble dye which has a tint of bright yellow and in which a number of counter ion or ions per one molecule is not more than 3 and a hue angle h* is 75° to 85°; or (2) a second water-soluble dye which has a tint of orange and in which a number of counter ion or ions per one molecule is not more than 3 and a hue angle h* is 30° to 70°; or (3) a second water-soluble dye which has a tint of red and in which a number of counter ion or ions per one molecule is not more than 3 and a hue angle h* is 0° to 30° or 350° to 360°, is used together with the first water-soluble dye, as the water-soluble dye capable of supplementing the insufficient coloring realized with the first water-soluble dye alone. This makes it possible to impart the satisfactory coloring to the dye-based yellow ink.

Figure 1:
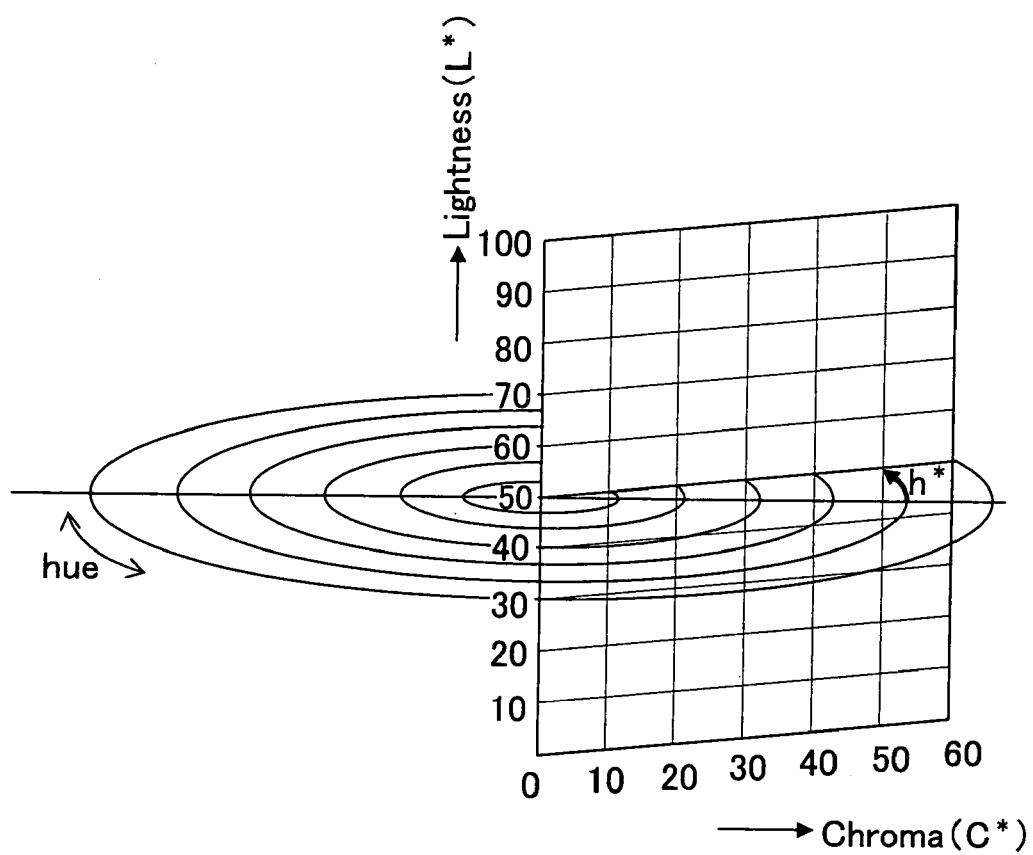
FIG. 1 is a three-dimensional diagram for explaining a hue and a lightness (L*) in the present invention.
Figure 2:
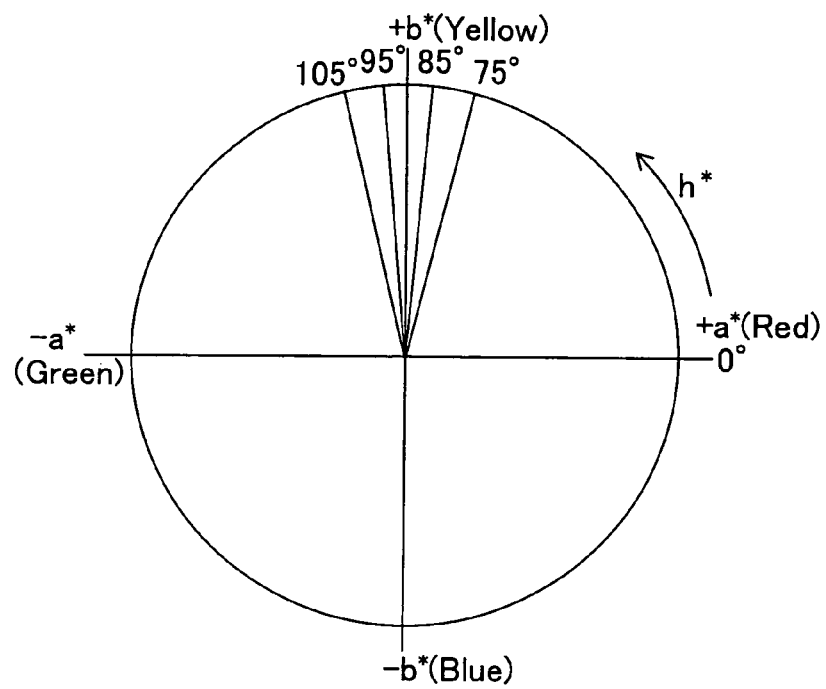
FIG. 2 is a diagram for explaining a hue angle (h*) in the present invention.

FIGS. 1 and 2 are diagrams for explaining a hue angle h* and a lightness L* in the L*a*b* color system and the L*c*h* color system which are used for specifying water-soluble dyes contained in the ink set of the present invention. In FIG. 1, a lightness L* or brightness (depth) of a color is indicated by a height position in the central axis of the concentric circle representing hue. As the value of lightness L* decreases, the color becomes deeper (darker), and as the value of brightness L* is greater, the color becomes paler (brighter). A chroma C* or chromaticity of the color is indicated by a radial position in the concentric circle representing the hue. As shown in FIG. 2, hue indicates a kind of a color on a plane of a circle defined by a*b* (a*b* plane). In FIG. 2, a* and b* respectively show a direction (region) of color. Specifically, +a* direction from the center of circle indicates a red color region, +b* direction indicates a yellow color region, −a* direction indicates a green color region, and −b* direction indicates a blue color region. Further, in the a*b* plane, as a color is positioned farther (outwardly) from the center of the circle (as the absolute values of a* and b* is greater), the color becomes more pronounced (high Chroma), and as the color is positioned nearer (inwardly) to the center of the circle (as the absolute values of a* and b* is smaller), the color fades progressively toward monotonous or achromatic (low Chroma). The hue angle h* is an angle indicating a kind of a color, when the color is represented by a point (position) in the a*b* plane in which an axis in the +a* (red region) direction is 0° and the hue angle h* is an angle of the point (position) of the color to the axis in the +a* direction. For example, a color having a hue angle of 90° to 105° in the a*b* plane is a yellow color with a tint of greenish yellow, and a color having a hue angle h* of 75° to 85° is a yellow color with a bright yellow tint.

The hue angle h* of each dye in the present invention is a hue angle measured in the following manner. A dye ink containing a dye to be measured (dye: 2.5% by weight, glycerol: 18.0% by weight; dipropylene glycol propyl ether (DPP): 2.0% by weight; ultrapure water: balance) was used to perform printing, and the printed article was measured with a calorimeter. As the calorimeter, ST-C manufactured by Suga Test Instruments Co., Ltd. was used and a hue angle h* when the value of L* was $84 \leq L^* \leq 90$ was measured with light source: D65 and field angle: 2°. An ink-jet printer MFC-3100C produced by Brother Industries, Ltd. was used as the apparatus for printing test. As the recording paper, a paper was used in which net weight was 65 to 100 g/cm$^2$; paper thickness was 80 to 110 μm; whiteness degree was not less than 80%; opacity was not less than 75%. Specifically, the paper may be exemplified by MULTI USE 20 PAPER manufactured by Great White, DATA COPY manufactured by M-Real Corporation, and 4200 DP 201b manufactured by XEROX. However, the paper is not limited to these papers.

First, an explanation will be made regarding the pigment-based black ink which is common to the water base ink sets for ink-jet recording of the first to fourth aspects of the present invention respectively.

As described above, the pigment-based black ink contains water, a self-dispersible black pigment, and a water-soluble solvent. The self-dispersible black pigment has dispersion stability greater than that of the dispersing agent-aided dispersion black pigment, even when added with the components necessary for the water base ink for ink-jet recording such as a moistening agent, a permeating agent, a surfactant and other additives, thereby realizing an increased freedom in designing the ink composition. As such a self-dispersible black pigment, any black pigment which is dispersible in the aqueous phase by itself may be used. In particular, a black pigment may be preferably used in which a surface oxidation treatment, a surface chemical bonding treatment or the like is applied so as to introduce anionic functional group to the surface of the pigment. Such a self-dispersible black pigment may be exemplified by the carbon black and variety of pigments other than the carbon black. Specifically, the self-dispersible black pigment may include, for example, CAB-O-JET 300, CAB-O-JET 200, CAB-O-JET 250, CAB-O-JET 260, CAB-O-JET 700 (respectively manufactured by Cabot), BONJET BLACK CW-1, BONJET BLACK CW-2, BONJET BLACK CW-3 (respectively manufactured by Orient, Ltd.).

The content of self-dispersing black pigment in the pigment-based black ink is preferably 0.1 to 20% by weight, more preferably 0.5 to 12% by weight, especially preferably 2 to 8% by weight as the pigment solid content with respect to the total amount of the pigment-based black ink. If the content is small like less than 0.1% by weight, then satisfactory printing quality is difficult to obtain. If the content is great like exceeding 20% by weight, the dispersion stability is lowered.

As the water used in the pigment-based black ink, it is preferable to use waters having high purities such as ion exchange water, distilled water and ultrapure water for the purpose of avoiding the clog-up of the nozzle or the like due to the impurities contained in water. The content of the water in the pigment-based black ink is generally 10 to 98% by weight, preferably 30 to 97% by weight, and more preferably 40 to 95% by weight with respect to the total weight of the ink.

The pigment-based black ink contains a water-soluble solvent as the permeating agent. As the water-soluble solvent, it is possible to use any water-soluble solvent which has less odor and low vapor pressure and which is used in a conventional pigment-based ink for ink-jet recording. By using such a water-soluble solvent, it is possible to effectively increase the speed at which the pigment-based black ink permeates into the recording paper and to improve the drying performance of the pigment-based black ink on the paper surface, thus preventing the bleeding caused by the slow drying of the ink on the paper, and suppressing the feathering accompanied by the permeation (whisker-shaped blurring along the paper fiber). The content of the water-soluble solvent in the pigment-based black ink is preferably 0.3 to 15% by weight, and more preferably 0.5 to 10% by weight. If the content is small like less than 0.3% by weight, then the speed at which the ink permeates into the recording paper is slow, the drying time need to be prolonged, and the problem of bleeding is likely to occur in some cases. If the content is great like exceeding 15% by weight, the ink is extremely permeated into the recording paper, the ink may reach the back of the recording paper in some cases, and the bleeding is likely to occur in other cases.

Specifically, the preferred water-soluble solvent to be blended in the pigment-based black ink may be exemplified by polyvalent alcohol monoalkyl ether such as diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, tripropylene glycol monobutyl ether.

The pigment-based black ink may further contain monovalent alcohol such as ethanol and isopropyl alcohol for the purpose of controlling the permeability into the recording paper and the drying performance on the paper of the ink. In addition, the ink may contain, as necessary, conventionally known additives such as dispersants, viscosity-adjusting agents, surface tension-adjusting agents, pH-adjusting agents, antiseptic/fungicidal agents.

Next, an explanation will be made regarding the dye-based yellow ink constituting the water base ink set for ink-jet recording. The dye-based yellow ink contains water; a first water-soluble dye which has a tint of greenish yellow and in which a number of counter ion or ions per one molecule is not more than 3 and a hue angle h* is 95° to 105° (see FIG. 2); and a water-soluble dye which is capable of supplementing the insufficient coloring realized with the first water-soluble dye alone. By using specific two kinds of dye in combination in this manner, satisfactory coloring can be imparted-to the dye-based yellow ink.

The first water-soluble dye, in which a number of counter ion or ions per one molecule is not more than 3 and a hue angle h* is 95° to 105°, and which is common to the dye-based yellow inks constituting the water base ink sets for ink-jet recording of the first to third aspects of the present invention, respectively, may be exemplified by C.I. Acid Yellow 23 (number of counter ions per one molecule: 3), C.I. Direct Yellow 132 (number of counter ions per one molecule: 2) or the like.

The content of the first water-soluble dye in the dye-based yellow ink constituting the water base ink set for ink-jet recording of the present invention is preferably 1.0 to 6.0% by weight and more preferably 1.6 to 5.0% by weight. If the content is small like less than 1.0% by weight, then satisfactory coloring is difficult to obtain. If the content is great like exceeding 6.0% by weight, the aggregation of the self-dispersible black pigment is likely to occur when the dye-based yellow ink contacts with the pigment-based black ink. Although the coloring of the due-based yellow ink and the aggregation of the black pigment is determined by a total amount of the first and second water-soluble dyes, when the blending amount of the first water-soluble dye in the dye-based yellow ink is outside the range of 1.0 to 6.0% by weight, it is difficult to obtain the effects of obtaining the desired satisfactory coloring and preventing the aggregation of black pigment even if the water-soluble dye used in combination with the first water-soluble dye were blended.

In the first aspect of the water-base ink set for ink-jet recording of the present invention, a second water-soluble dye, which has a tint of bright yellow and in which a number of counter ion or ions per one molecule is not more than 3 and a hue angle h* is 75° to 85° (See FIG. 2), is used as the water-soluble dye capable of supplementing the insufficient coloring realized with the first water-soluble dye alone.

Specifically, the second water-soluble dye may include C.I. Acid Yellow 99 (number of counter ions per one molecule: 2) or the like. Accordingly, the coloring as the dye-based yellow ink can be satisfactory.

In the first aspect of the water-base ink set for ink-jet recording of the present invention, the weight ratio of the second water-soluble dye to the first water-soluble dye is 10.0 to 100.0% and preferably 15.0 to 95.0%. If the weight ratio is small like less than 10.0%, then any sufficient coloring cannot be obtained. If the weight ratio is great like exceeding 100.0%, then not only any sufficient coloring cannot be obtained but also the aggregation of the self-dispersible black pigment can occur when the dye-based yellow ink contacts with the pigment-based black ink.

Figure 3:
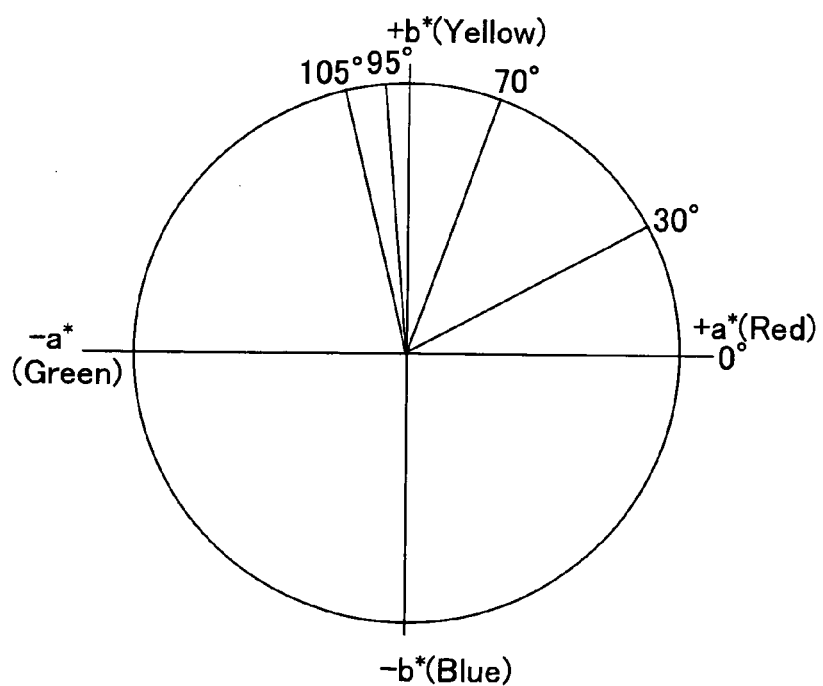
FIG. 3 is a diagram for explaining a relationship between hue angles of first and second water-soluble dyes in the second aspect of the present invention.

In the second aspect of the water-base ink set for ink-jet recording of the present invention, a second water-soluble dye, which has a tint of orange and in which a number of counter ion or ions per one molecule is not more than 3 and a hue angle h* is 30° to 70° (as shown in FIG. 3), is used as the water-soluble dye which is capable of supplementing the insufficient coloring realized with the first water-soluble dye alone. Specifically, the second water-soluble dye may include C.I. Acid Orange 51 (number of counter ions per one molecule: 2), C.I. Acid Orange 56 (number of counter ions per one molecule: 2), C.I. Acid Orange 74 (number of counter ion per one molecule: 1) or the like. Accordingly, the coloring as the dye-based yellow ink can be satisfactory.

In the second aspect of the water-base ink set for ink-jet recording of the present invention, the weight ratio of the second water-soluble dye to the first water-soluble dye is 0.8 to 5.5% and preferably 0.9 to 5.0%. If the weight ratio is small like less than 0.8%, then any sufficient coloring cannot be obtained. If the weight ratio is great like exceeding 5.5%, then the tint of orange becomes too strong so that the color of the ink cannot be considered as normal yellow.

Figure 4:
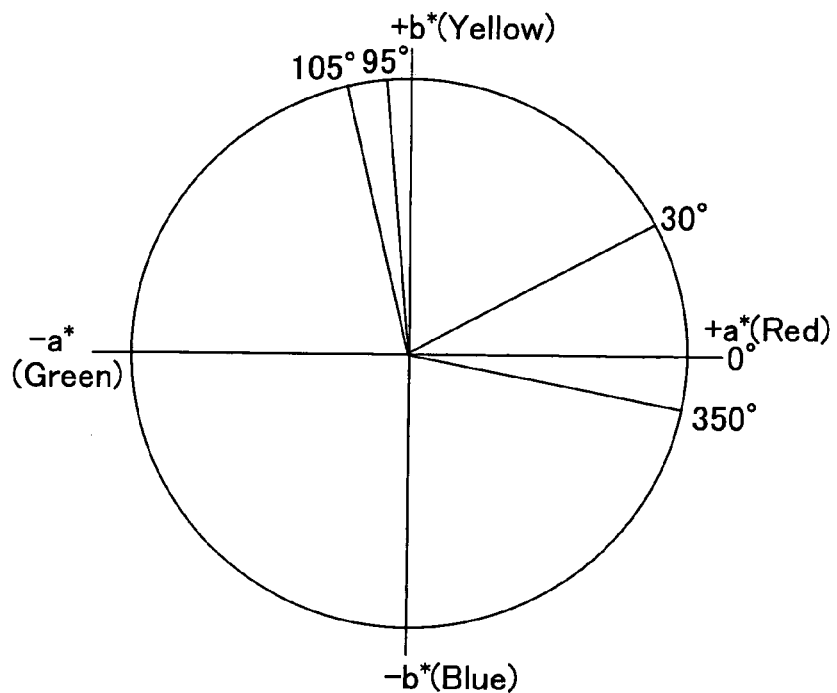
FIG. 4 is a diagram for explaining a relationship between hue angles of first and second water-soluble dyes in the third aspect of the present invention.

In the third aspect of the water-base ink set for ink-jet recording of the present invention, a second water-soluble dye, which has a tint of red and in which a number of counter ion or ions per one molecule is not more than 3 and a hue angle h* is 0° to 30° or 350° to 360° (see FIG. 4), is used as the water-soluble dye which is capable of supplementing the insufficient coloring realized with first water-soluble dye alone. Specifically, the second water-soluble dye may include C.I. Acid Red 249 (number of counter ions per one molecule: 2), C.I. Acid Red 87 (number of counter ions per one molecule: 2), C.I. Acid Red 94 (number of counter ions per one molecule: 2) or the like. Accordingly, the coloring as the dye-based yellow ink can be satisfactory.

In the third aspect of the water-base ink set for ink-jet recording of the present invention, the weight ratio of the second water-soluble dye to the first water-soluble dye is 0.3 to 3.5% and preferably 0.4 to 3.0%. If the weight ratio is small like less than 0.3%, then any sufficient coloring cannot be obtained. If the weight ratio is great like exceeding 3.5%, then the tint of red becomes too strong so that the color of the ink cannot be considered as normal yellow.

Figure 5:
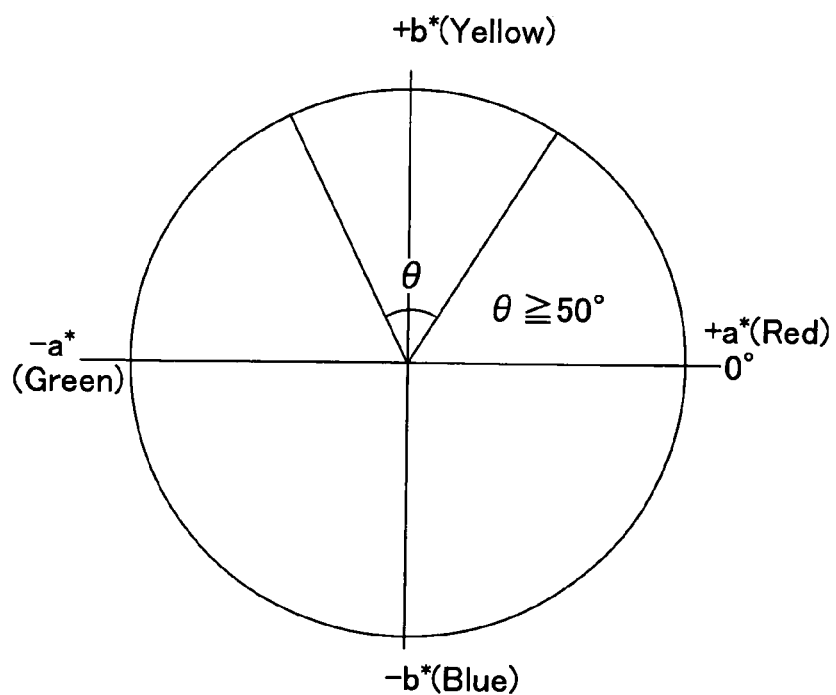
FIG. 5 is a diagram for explaining a relationship between hue angles of first and second water-soluble dyes in the fourth aspect of the present invention.

In the fourth aspect of the water-base ink set for ink-jet recording of the present invention, a first water-soluble dye has not more than 3 of counter ion or ions per one molecule. In the water base ink set, a second water-soluble dye in which a number of counter ion or ions per one molecule is not more than 3 and which has a hue angle h* different from that of the first water-soluble dye by not less than 50° (see FIG. 5) is used as the water-soluble dye which is capable of supplementing the insufficient coloring realized with the first water-soluble dye alone. In the fourth aspect of the water-base ink set for ink-jet recording of the present invention, the weight ratio of the second water-soluble dye to the first water-soluble dye is 0.3 to 5.5%, preferably 0.3 to 3.5%, and more preferably 0.4 to 3.0%. If the weight ratio is small like less than 0.3%, then any sufficient coloring cannot be obtained. If the weight ratio is great like exceeding 5.5%, then any yellow color with the desired complex tint cannot be obtained.

In the water base ink set for ink-jet recording of the present invention, the content of the water-soluble dyes in the dye-based yellow ink (namely, the content of the mixed dye of the first water-soluble dye and the second water-soluble dye having the tint of bright yellow, or the second water-soluble dye having the tint of orange, or the second water-soluble dye having the tint of red, or the second water-soluble dye having the hue angle h* different from that of the first water-soluble dye by not less than 50° (preferably by not less than 90°) is 1.8 to 5.5% by weight and preferably 2.0 to 4.0% by weight. If the content is small like less than 1.8% by weight, then any sufficient coloring and/or OD value (Optical Density value), cannot be obtained. If the content is great like exceeding 5.5% by weight, then the aggregation of the self-dispersible black pigment in the pigment-based black ink can occur, and the dispersion stability of the pigment can be lowered.

As the water used in the dye-based yellow ink, it is preferable to use waters having high purities such as ion exchange water, distilled water and ultrapure water for the purpose of avoiding the clog-up of the nozzle or the like due to the impurities contained in water. The content of the water in the dye-based yellow ink is generally 10 to 98% by weight, preferably 30 to 97% by weight, and more preferably 40 to 95% by weight with respect to the total weight of the ink.

In the water base ink set for ink-jet recording of the present invention, the dye-based yellow ink of the present invention preferably contains at least one water-soluble solvent as the permeating agent. As the water-soluble solvent, it is possible to use any water-soluble solvent which has less odor and low vapor pressure and which is used in a conventional pigment or dye-based ink for ink-jet recording. By using such a water-soluble solvent, it is possible to increase the speed at which the dye-based yellow ink permeates into the recording paper and to improve the drying performance of the dye-based yellow ink on the paper surface, thus preventing the bleeding caused by the slow drying of the ink on the paper and suppressing the feathering accompanied by the permeation. The content of the water-soluble solvent in the dye-based yellow ink is preferably 0.3 to 15% by weight and more preferably 0.5 to 10% by weight. If the content is small like less than 0.3% by weight, then the speed at which the dye-based yellow ink permeates into the recording paper is slow, the drying time need to be prolonged, and the problem of bleeding may occur in some cases. If the content is great like exceeding 15% by weight, the dye-based yellow ink is extremely permeated into the recording paper, the ink may reach the back of the recording paper in some cases, and the bleeding may occur in other cases.

specifically, the preferred water-soluble solvent to be blended in the dye-based yellow ink may be exemplified by polyvalent alcohol monoalykyl ether such as diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, tripropylene glycol monobutyl ether.

In the present invention, it is desired that the water-soluble solvent used in the pigment-based black ink and the water-soluble solvent used in the dye-based yellow ink are same for the purpose of preventing the solvent shock which may occur when the pigment-based black ink and the dye-based yellow ink contact with each other.

The dye-based yellow ink may further contain monovalent alcohol such as ethanol and isopropyl alcohol for the purpose of controlling the permeability of the ink into the recording paper and the drying performance of the ink on the paper. In addition, the ink may contain, as necessary, conventionally known additives such as dispersants, viscosity-adjusting agents, surface tension-adjusting agents, pH-adjusting agents, antiseptic/fungicidal agents.

In the water base ink set for ink-jet recording of the present invention, a dye-based magenta ink and a dye-based cyan ink or the like which satisfy performance sufficient for the water base ink for ink-jet recording may be used in combination with the above-described pigment-based black ink and dye-based yellow ink.

As explained above, the problems associated with the conventional water base ink set are sufficiently solved in the water base ink set for ink-jet recording of the present invention. Accordingly, the ink set for ink-jet recording of the present invention may be applied to the ink-jet recording method such as the electrostatic suction system, the system using piezoelectric elements, the thermal system or the like. In addition, even when the dye-based yellow ink and the pigment-based black ink containing the self-dispersible black ink contact with each other, the ink set does not cause any problem such as the discharge failure or the incorrect discharge in ink flying direction (bending) which would be otherwise caused by the aggregation of the black pigment. Accordingly, the water base ink set for ink-jet recording of the present invention is capable of realizing a high reliability as a product.

When the water base ink set for ink-jet recording of the present invention is applied to the ink-jet recording method of thermal system, thermal physical values (such as the specific heat, the coefficient of thermal expansion, and the coefficient of thermal conductivity) may be adjusted as appropriate.

EXPERIMENTAL EXAMPLES

The present invention will be explained in further detail below as exemplified by specific Experimental Examples. However, the present invention is not limited only to Experimental Examples.

Example 1

A pigment-based black ink was prepared by uniformly mixing 33.3% by weight of CAB-O-JET 300 (produced by Cabbot, concentration of solid content: 15%), 25.0% by weight of glycerol, 0.50% by weight of dipropylene glycol propyl ether (DPP) as the water-soluble solvent, and balance of ultrapure water. A dye-based yellow ink was prepared by uniformly mixing 3.0% by weight of C.I. Acid Yellow 23 (number of counter ions per one molecule: 3), 0.50% by weight of C.I. Acid Yellow 99 (number of counter ions per one molecule: 2), 18.0% by weight of glycerol, 2.0% by weight of dipropylene glycol propyl ether (DPP) as the water-soluble solvent, and balance of ultrapure water. These two inks were used to constitute a water base ink set for ink-jet recording.

Examples 2 to 19

Ink sets of Examples 2 to 19 were prepared respectively in the same manner as with Example 1 in accordance with the blending prescription shown in Tables 1 to 3.

Evaluation

The ink sets obtained in Examples 1 to 19, respectively, were subjected to the evaluation of aggregation by microscopic observation, the evaluation of nozzle clog-up, the evaluation of durability of suction pump for purging operation, and the evaluation of coloring, as will be explained below. The obtained results for respective evaluations are shown in Tables 1 to 3.

Evaluation of Aggregation by Microscopic Observation

With respect to each of the ink sets of Examples 1 to 19, one ink droplet of the pigment-based black ink and one ink droplet of the dye-based yellow ink were dropped onto a slide glass while being separated from each other. A cover glass was gently placed on the two droplets from above so that the two inks were allowed to make contact with each other beneath the cover glass. A contact area of these two droplets was observed with a microscope, and the situation of aggregation of the pigment was observed. The evaluation was made in accordance with the following criteria.

Evaluation Criteria for Aggregation by Microscopic Observation:

| Rank | Criteria |
|---|---|
| +: | No aggregation was observed in the contact border; |
| ±: | Although aggregation of the black pigment in the black ink was observed in the contact border, the fluidity of the ink was not affected; and |
| −: | The aggregation and solidification of the black pigment in the black ink was observed in the contact border, and the fluidity of the ink was lost. |

Evaluation of Nozzle Clog-Up

Each of the water base ink sets for ink-jet recording obtained in Examples 1 to 19 was attached to an ink-jet printer (MFC-3100C produced by Brother Industries, Ltd.) to perform a continuous wiping test for the head nozzle surface carried out 3,000 times at room temperature, and the nozzle clog-up was evaluated in accordance with the following evaluation criteria. The obtained results are shown in Tables 1 to 3. In this printer, during the wiping operation of the head nozzle surface, nozzle arrays for discharging the pigment-based black ink and the dye-based yellow ink, respectively, are wiped simultaneously in the direction that crosses the direction of the nozzle arrays. Due to the simultaneous wiping, the pigment-based black ink and the dye-based yellow ink can contact with each other.

Evaluation Criteria for Nozzle Clog-Up:

| Rank | Criteria |
|---|---|
| ++: | No discharge failure nor bending of the discharged ink was caused at all after the continuous wiping test for the head nozzle surface carried out 3,000 times. |

-continued

| Rank | Criteria |
|---|---|
| +: | The discharge failure and the bending of discharged ink were slightly caused after the continuous wiping test for the nozzle surface carried out 3,000 times, but the discharge failure and the bending of the discharged ink were resolved after performing a purge operation one time. |
| ±: | The discharge failure and the bending of discharged ink were slightly caused after the continuous wiping test for the head nozzle surface carried out 3,000 times, but the discharge failure and the bending of the discharged ink were resolved after performing the purge operation 2 to 5 times. |
| −: | The discharge failure and the bending of discharged ink were caused many times after the continuous wiping test for the head nozzle surface carried out 3,000 times, and both of the discharge failure and the bending of the discharged ink were not resolved in a short period of time. |

Evaluation of Durability of Suction Pump for Purging Operation

Each of the water base ink sets for ink-jet recording obtained in Examples 1 to 19 was attached to the ink-jet printer MFC-3100C (produced by Brother Industries, Ltd.) to perform a continuous suction purge test carried out 10,000 times at room temperature, and the durability of suction pump for purge operation was evaluated in accordance with the following criteria.

Evaluation Criteria for Durability of Suction Pump:

++: In a continuous suction purge test carried out 10,000 times, the amount of suction per one time was within a range of 0.26 to 0.30 cc which is the prescribed amount.

+: In a continuous suction purge test carried out 10,000 times, the amount of suction per one time was less than 0.26 cc which is the lower limit value of the prescribed amount. However, In a continuous suction purge test carried out 5,000 times, the amount of suction per one time was within a range of 0.26 to 0.30 cc which is the prescribed amount.

±: In a continuous suction purge test carried out 5,000 times, the amount of suction per one time was less than 0.26 cc which is the lower limit value of the prescribed amount. However, in a continuous suction purge test carried out 3,000 times, the amount of suction per one time was within a range of 0.26 to 0.30 cc which is the prescribed amount.

−: In a continuous suction purge test carried out 3,000 times, the amount of suction per one time was less than 0.26 cc which is the lower limit value of the prescribed amount.

Evaluation of Coloring

As described above, in an article printed with yellow ink, when the value L* is 84≦L*≦90, and the value h* is 85°≦h*≦95°, it is evaluated that the printed article has a satisfactory coloring as the yellow color. In this case, it is also evaluated that a range of red or green color reproduction is satisfactory in a secondary color with magenta or cyan. Each of the dye-based yellow inks obtained in Examples 1 to 19 was evaluated as follows. Each of the dye-based yellow inks obtained in Examples 1 to 19 was filled in a desired ink tank, which was then attached to the ink-jet printer MFC-3100C (produced by Brother Industries, Ltd.) to perform a printing test. The coloring of the printed articles obtained with the respective dye-based yellow inks in the printing test was measured with a calorimeter. Accordingly, as indicated in the following criteria for evaluation, the coloring of each of the yellow inks was evaluated whether or not the L* value and h* value were within the above-described ranges, respectively. With respect to Examples 8-19, however, the evaluation for coloring was not carried out for any one of Examples 8-19 for which the result for the evaluation of aggregation by microscopic observation was "−" or "±". As the colorimeter, SC-T manufactured by Suga Test Instruments Co., Ltd. was used. The conditions for measuring L*a*b* values were that the light source was D65 and field angle was 2°. As the recording paper, MULTI USE 20 PAPER manufactured by Great White was used. The coloring was evaluated in accordance with the following criteria.

Evaluation Criteria for Coloring:

| Rank | Criteria |
|---|---|
| +: | L* value is 84 ≦ L* ≦ 90 and h* value is 85° ≦ h* ≦ 95°. |
| −: | Rank is other than "+". |

TABLE 1

|  |  |  | Examples (Unit: % by weight) | | | | | | |
|---|---|---|---|---|---|---|---|---|---|
|  |  |  | 1 | 2 | 3 | 4 | 5 | 6 | 7 |
| Black ink | CAB-O-JET 300 (*1) | | 33.3 | 33.3 | | | | 33.3 | 33.3 |
|  | CAB-O-JET 200 (*1) | | | | 33.3 | | 33.3 | | |
|  | BONJET BLACK CW-1 (*2) | | | | | 30 | | | |
|  | Glycerol | | 25.0 | 25.0 | 23.0 | 28.0 | 23.0 | 23.0 | 25.0 |
|  | dipropylene glycol propyl ether | | 0.50 | 0.50 | 0.30 | | | 0.30 | 0.50 |
|  | triethylene glycol butyl ether | | | | | 1.00 | | | |
|  | tripropylene glycol monobutyl ether | | | | | | 0.30 | | |
|  | ultrapure water | | balance | balance | balance | balance | balance | balance | balance |
| Yellow Ink | water-soluble dye (*3) | h* | | | | | | | |
|  | A  Acid Yellow 99 <2> | 83.1 | 0.50 | | | | | | 1.30 |
|  |    Direct Yellow 86 <4> | 82.5 | | | | | | | |
|  | B  Acid Yellow 23 <3> | 97.3 | 3.00 | 3.00 | 2.00 | | | 3.00 | |
|  |    Direct Yellow 132 <2> | 96.3 | | | | 3.00 | 3.00 | | 1.50 |
|  |    Acid Yellow 50 <4> | 97.8 | | | | | | | |
|  |    Direct Yellow 50 <4> | 97.8 | | | | | | | |
|  | C  Acid Orange 56 <2> | 44.9 | | 0.03 | 0.04 | | | | |
|  |    Acid Orange 51 <2> | 44.9 | | | | 0.12 | | | |

TABLE 1-continued

|  |  |  |  | Examples (Unit: % by weight) |  |  |  |  |  |  |
|---|---|---|---|---|---|---|---|---|---|---|
|  |  |  |  | 1 | 2 | 3 | 4 | 5 | 6 | 7 |
|  | D | Acid Red 87 <2> | 357.8 |  |  |  |  | 0.015 |  |  |
|  |  | Acid Red 249 <2> | 2.1 |  |  |  |  |  | 0.075 |  |
|  |  | Direct Red 80 <4> | 4.2 |  |  |  |  |  |  |  |
|  |  | Weight ratio of water-soluble dye A, C or D to dye B |  | 16.7% (A/B) | 1.0% (C/B) | 2.0% (C/B) | 4.0% (C/B) | 0.5% (D/B) | 2.5% (D/B) | 86.7% (A/B) |
|  |  | Glycerol |  | 18.0 | 18.0 | 30.0 | 18.0 | 30.0 | 30.0 | 18.0 |
|  |  | dipropylene glycol propyl ether |  | 2.00 | 2.00 | 2.00 |  |  | 2.00 |  |
|  |  | triethylene glycol butyl ether |  |  |  |  | 4.50 |  |  | 2.00 |
|  |  | tripropylene glycol monobutyl ether |  |  |  |  |  | 0.50 |  |  |
|  |  | ultrapure water |  | balance | balance | balance | balance | balance | balance | balance |
| Evaluation | Microscopic Observation of Aggregation |  |  | + | + | + | + | + | + | + |
|  | Nozzle Clog-up |  |  | + | + | ++ | + | ++ | ++ | + |
|  | Durability of Suction Pump for Purging Operation |  |  | + | ++ | ++ | + | ++ | + | + |
|  | Coloring (*4) |  |  | + | + | + | + | + | + | + |
|  | L* |  |  | 89.6 | 87.3 | 87.1 | 85.0 | 85.7 | 84.5 | 84.2 |
|  | a* |  |  | −4.1 | −4.8 | −4.1 | 2.0 | −1.1 | 0.1 | 4.8 |
|  | b* |  |  | 83.4 | 85.0 | 80.3 | 71.9 | 71.9 | 81.2 | 78.3 |
|  | h* |  |  | 92.8 | 93.2 | 92.9 | 88.4 | 90.9 | 89.9 | 86.5 |

(*1) Manufactured by Cabbot; concentration of solid content: 15%
(*2) Manufactured by Orient, Ltd.; concentration of solid content: 20%
(*3) Numbers indicated in brackets "<>" respectively represents "number of counter ions per one molecule".
(*4) the evaluation for coloring (L*a*b*h*) was not carried out for any example for which the result for the evaluation of aggregation by microscopic observation was "−" or "±".

TABLE 2

|  |  |  |  | Examples (Unit: % by weight) |  |  |  |  |  |  |
|---|---|---|---|---|---|---|---|---|---|---|
|  |  |  |  | 8 | 9 | 10 | 11 | 12 | 13 | 14 |
| Black ink | CAB-O-JET 300 (*1) |  |  | 33.3 | 33.3 | 33.3 | 33.3 | 33.3 | 33.3 |  |
|  | CAB-O-JET 200 (*1) |  |  |  |  |  |  |  |  | 33.3 |
|  | BONJET BLACK CW-1 (*2) |  |  |  |  |  |  |  |  |  |
|  | Glycerol |  |  | 25.0 | 25.0 | 25.0 | 25.0 | 25.0 | 25.0 | 23.0 |
|  | dipropylene glycol propyl ether |  |  | 0.50 | 0.50 | 0.50 | 0.50 | 0.50 | 0.50 |  |
|  | triethylene glycol butyl ether |  |  |  |  |  |  |  |  |  |
|  | tripropylene glycol monobutyl ether |  |  |  |  |  |  |  |  | 0.3 |
|  | ultrapure water |  |  | balance | balance | balance | balance | balance | balance | balance |
| Yellow Ink | water-soluble dye (*3) |  | h* |  |  |  |  |  |  |  |
|  | A | Acid Yellow 99 <2> | 83.1 | 0.50 |  | 0.20 |  |  |  |  |
|  |  | Direct Yellow 86 <4> | 82.5 |  | 0.50 |  |  |  |  |  |
|  | B | Acid Yellow 23 <3> | 97.3 |  | 3.00 | 2.50 | 1.50 | 3.00 | 3.00 |  |
|  |  | Direct Yellow 132 <2> | 96.3 |  |  |  |  |  |  | 3.00 |
|  |  | Acid Yellow 50 <4> | 97.8 | 3.00 |  |  |  |  |  |  |
|  |  | Direct Yellow 50 <4> | 97.8 |  |  |  |  |  |  |  |
|  | C | Acid Orange 56 <2> | 44.9 |  |  |  | 0.03 | 0.30 | 0.02 |  |
|  |  | Acid Orange 51 <2> | 44.9 |  |  |  |  |  |  |  |
|  | D | Acid Red 87 <2> | 357.8 |  |  |  |  |  |  |  |
|  |  | Acid Red 249 <2> | 2.1 |  |  |  |  |  |  |  |
|  |  | Direct Red 80 <4> | 4.2 |  |  |  |  |  |  | 0.04 |
|  |  | Weight ratio of water-soluble dye A, C or D to dye B |  | 16.7% (A/B) | 16.7% (A/B) | 8.0% (A/B) | 2.0% (C/B) | 10.0% (C/B) | 0.5% (C/B) | 1.3% (D/B) |
|  |  | Glycerol |  | 18.0 | 18.0 | 18.0 | 18.0 | 18.0 | 18.0 | 30.0 |
|  |  | dipropylene glycol propyl ether |  | 2.00 | 2.00 | 2.00 | 2.00 | 2.00 | 2.00 |  |
|  |  | triethylene glycol butyl ether |  |  |  |  |  |  |  |  |
|  |  | tripropylene glycol monobutyl ether |  |  |  |  |  |  |  | 0.50 |
|  |  | ultrapure water |  | balance | balance | balance | balance | balance | balance | balance |
| Evaluation | Microscopic Observation of Aggregation |  |  | − | − | + | + | + | + | ± |
|  | Nozzle Clog-up |  |  | − | − | + | ++ | + | ++ | − |
|  | Durability of Suction Pump for Purging Operation |  |  | − | ± | ++ | ++ | ++ | + | + |
|  | Coloring (*4) |  |  |  |  | − | − | − | − |  |
|  | L* |  |  |  |  | 85.9 | 89.9 | 85.1 | 88.4 |  |
|  | a* |  |  |  |  | −7.5 | −11.1 | 17.9 | −9.8 |  |

TABLE 2-continued

|  | Examples (Unit: % by weight) | | | | | | |
|---|---|---|---|---|---|---|---|
|  | 8 | 9 | 10 | 11 | 12 | 13 | 14 |
| b* |  |  | 74.0 | 72.2 | 74.3 | 80.2 |  |
| h* |  |  | 95.8 | 98.7 | 76.5 | 97.0 |  |

(*1) Manufactured by Cabbot; concentration of solid content: 15%
(*2) Manufactured by Orient, Ltd.; concentration of solid content: 20%
(*3) Numbers indicated in brackets "<>" respectively represents "number of counter ions per one molecule".
(*4) the evaluation for coloring (L*a*b*h*) was not carried out for any example for which the result for the evaluation of aggregation by microscopic observation was "−" or "±".

TABLE 3

|  |  |  | Examples(Unit: % by weight) | | | | |
|---|---|---|---|---|---|---|---|
|  |  |  | 15 | 16 | 17 | 18 | 19 |
| Black ink | CAB-O-JET 300 (*1) |  | 33.3 | 33.3 |  |  |  |
|  | CAB-O-JET 200 (*1) |  |  |  | 33.3 | 33.3 | 33.3 |
|  | BONJET BLACK CW-1 (*2) |  |  |  |  |  |  |
|  | Glycerol |  | 25.0 | 25.0 | 23.0 | 23.0 | 23.0 |
|  | dipropylene glycol propyl ether |  | 0.50 | 0.50 |  |  |  |
|  | triethylene glycol butyl ether |  |  |  |  |  |  |
|  | tripropylene glycol monobutyl ether |  |  |  | 0.3 | 0.3 | 0.3 |
|  | ultrapure water |  | balance | balance | balance | balance | balance |
| Yellow Ink | water-soluble dye (*3) | h* |  |  |  |  |  |
|  | A  Acid Yellow 99 <2> | 83.1 |  |  |  |  |  |
|  |     Direct Yellow 86 <4> | 82.5 |  |  |  |  |  |
|  | B  Acid Yellow 23 <3> | 97.3 |  |  |  |  |  |
|  |     Direct Yellow 132 <2> | 96.3 |  |  |  | 3.00 | 3.00 |
|  |     Acid Yellow 50 <4> | 97.8 |  |  |  |  |  |
|  |     Direct Yellow 50 <4> | 97.8 | 5.50 | 3.00 | 3.00 |  |  |
|  | C  Acid Orange 56 <2> | 44.9 | 0.10 | 0.20 |  |  |  |
|  |     Acid Orange 51 <2> | 44.9 |  |  |  |  |  |
|  | D  Acid Red 87 <2> | 357.8 |  |  |  |  |  |
|  |     Acid Red 249 <2> | 2.1 |  |  |  |  |  |
|  |     Direct Red 80 <4> | 4.2 |  |  |  | 0.04 | 0.15 |
|  | Weight ratio of water-soluble dye A, C or D to dye B |  | 1.8% (C/B) | 6.7% (C/B) | 1.3% (D/B) | 5.0% (D/B) |  |
|  | Glycerol |  | 18.0 | 18.0 | 30.0 | 30.0 | 30.0 |
|  | dipropylene glycol propyl ether |  | 2.00 | 2.00 |  |  |  |
|  | triethylene glycol butyl ether |  |  |  |  |  |  |
|  | tripropylene glycol monobutyl ether |  |  |  | 0.5 | 0.5 | 0.5 |
|  | ultrapure water |  | balance | balance | balance | balance | balance |
| Evaluation | Microscopic Observation of Aggregation |  | − | − | − | ± | + |
|  | Nozzle Clog-up |  | − | ± | − | − | ++ |
|  | Durability of Suction Pump for Purging Operation |  | − | ± | ± | ± | ++ |
|  | Coloring (*4) |  |  |  |  |  | − |
|  | L* |  |  |  |  |  | 87.3 |
|  | a* |  |  |  |  |  | −8.2 |
|  | b* |  |  |  |  |  | 74.2 |
|  | h* |  |  |  |  |  | 96.3 |

(*1) Manufactured by Cabbot; concentration of solid content: 15%
(*2) Manufactured by Orient, Ltd.; concentration of solid content: 20%
(*3) Numbers indicated in brackets "<>" respectively represents "number of counter ions per one molecule".
(*4) the evaluation for coloring (L*a*b*h*) was not carried out for any example for which the result for the evaluation of aggregation by microscopic observation was "−" or "±".

As shown in Table 1 to 3, the ink sets for ink-jet recording obtained in Examples 1 to 7, respectively, use a water-soluble yellow dye B, which has a tint of greenish yellow and in which a number of counter ion or ions per one molecule is not more than 3 and a hue angle h* is 95° to 105°, together with a water-soluble yellow dye A which has a tint of bright yellow and in which a number of counter ion or ions per one molecule is not more than 3 and a hue angle h* is 75° to 85°, or a water-soluble orange dye C in which a number of counter ion or ions per one molecule is not more than 3 and a hue angle h* is 30° to 70°, or a water-soluble red dye D in which a number of counter ion or ions per one molecule is not more than 3 and a hue angle h* is 0° to 30° or 350° to 360°. Accordingly, each of the ink sets of Examples 1 to 7 exhibits a sufficient performance as the water base ink set for ink-jet recording. Namely, the ink sets of Examples 1-7 can prevent any aggregation of the self-dispersible black pigment dispersed in the pigment-based black ink which would be otherwise caused when the pigment-based black ink contacts with the dye-based yellow ink, and the ink sets can also prevent the problems such as clog-up of the nozzle and the operational failure of suction pump for purging operation. In addition, in each of the ink sets of Examples 1 to 7, the coloring of the dye-based yellow ink is sufficiently satisfactory. Further, in the ink sets of Examples 2 to 6, the difference in the hue angle h between the two water-soluble dyes is not less than 50° respectively, and in particular, not less than 90° in Examples 5 and 6 respectively. It is appreciated that the amount of water-soluble dyes used in a case in which the difference in hue angles h* between the water-soluble dyes is not less than 50° can be less than a case in which the difference in the hue angle h* is small (Example 1).

On the other hand, in Example 19, the coloring performance was not satisfactory because the dye-based yellow ink uses, as the coloring agent, only the water-soluble dye B which has a tint of greenish yellow and in which a hue angle h* is 95° to 105°.

Examples 8, 9 and 14 to 18 use at least one water-soluble dye in which a number of counter ions per one molecule is 4. Accordingly, it is appreciated that the inks of these examples had a problem of the aggregation of self-dispersible black pigment in a portion in which the dye-based yellow ink and the pigment-based black ink are mixed with each other, and had unsatisfactory results in "evaluations for the clog-up of the nozzle" or "evaluation of durability of suction pump for purging operation". With respect to Example 10, in which the weight ratio of the water-soluble dye A to the water-soluble dye B [A/B] was 8.0%, the evaluation of coloring was not satisfactory. It is appreciated that the coloring tend to lower as the value of weight ratio becomes too small, as compared with Examples 1 and 7 in which [A/B] were 16.7% and 86.7%, respectively and the evaluation for coloring were satisfactory.

With respect to Example 11, in which the blending amount of the water-soluble dyes in the dye-based yellow ink was 1.53%,by weight, the evaluation of coloring was not satisfactory. It is appreciated that the coloring tends to lower as the blending amount of the water-soluble dyes in the dye-based yellow ink becomes too small, as compared with Example 2 in which the blending amount of water-soluble dyes was 3.03% by weight and the evaluation for coloring was satisfactory.

With respect to Examples 12 and 13, in which the weight ratio of the water-soluble dye C to the water-soluble dye B [C/B] was 10.0% and 0.5%, respectively, the evaluation of coloring were not satisfactory. It is appreciated that the coloring tend to lower as the value of weight ratio becomes too small or too large, as compared with Examples 2 to 4 in which weight ratio of the water-soluble dye C to the water-soluble dye B [C/B] were 1.0%, 2.0% and 4.0%, respectively and the evaluation for coloring were satisfactory.

The water base ink set for ink-jet recording of the present invention includes the pigment-based black ink containing the self-dispersible black pigment and the dye-based yellow ink containing a specific yellow dye in which a number of counter ion or ions is not more than 3 and which has a hue angle in a specific range, and other water-soluble dye. Accordingly, the ink set does not cause any aggregation of black pigment dispersed in the pigment-based black ink even when the pigment-based black ink and the dye-based yellow ink contact with each other. Thus, the ink set prevents the problem such as the clog-up of the nozzle and the operational failure of the suction pump for maintenance operation. Therefore, the ink set is suitable for the use in the ink-jet printer.

What is claimed is:

1. A water base ink set for ink-jet recording comprising:
   a pigment-based black ink containing water, a self-dispersible black pigment, and a water-soluble solvent; and
   a dye-based yellow ink containing water, a first water-soluble dye in which a number of counter ion or ions per one molecule is not more than 3 and a hue angle h* is 95° to 105°, and a second water-soluble dye in which a number of counter ion or ions per one molecule is not more than 3 and a hue angle h* is 75° to 85°, wherein:
   a weight ratio of the second water-soluble dye to the first water-soluble dye in the dye-based yellow ink is 10.0 to 100.0%; and
   a total content of the first and second water-soluble dyes in the dye-based yellow ink is 1.8 to 5.5% by weight.

2. The ink set for ink-jet recording according to claim 1, wherein a value of a lightness L* is $84 \leq L^* \leq 90$ and a value of the hue angle h* is $85° \leq h^* \leq 95°$ in the dye-based yellow ink.

3. A water base ink set for ink-jet recording comprising:
   a pigment-based black ink containing water, a self-dispersible black pigment, and a water-soluble solvent; and
   a dye-based yellow ink containing water, a first water-soluble dye in which a number of counter ion or ions per one molecule is not more than 3 and a hue angle h* is 95° to 105°, and a second water-soluble dye in which a number of counter ion or ions per one molecule is not more than 3 and a hue angle h* is 30° to 70°, wherein:
   a weight ratio of the second water-soluble dye to the first water-soluble dye in the dye-based yellow ink is 0.8 to 5.5%; and
   a total content of the first and second water-soluble dyes in the dye-based yellow ink is 1.8 to 5.5% by weight.

4. The ink set for ink-jet recording according to claim 3, wherein a value of a lightness L* is $84 \leq L^* \leq 90$ and a value of the hue angle h* is $85° \leq h^* \leq 95°$ in the dye-based yellow ink.

5. A water base ink set for ink-jet recording comprising:
   a pigment-based black ink containing water, a self-dispersible black pigment, and a water-soluble solvent; and
   a dye-based yellow ink containing water, a first water-soluble dye in which a number of counter ion or ions per one molecule is not more than 3 and a hue angle h* is 95° to 105°, and a second water-soluble dye in which a number of counter ion or ions per one molecule is not more than 3 and a hue angle h* is 0° to 30° or 350° to 360°, wherein:
   a weight ratio of the second water-soluble dye to the first water-soluble dye in the dye-based yellow ink is 0.3 to 3.5%; and
   a total content of the first and second water-soluble dyes in the dye-based yellow ink is 1.8 to 5.5% by weight.

6. The ink set for ink-jet recording according to claim 5, wherein a value of a lightness L* is $84 \leq L^* \leq 90$ and a value of the hue angle h* is $85° \leq h^* \leq 95°$ in the dye-based yellow ink.

7. A water base ink set for ink-jet recording comprising:
   a pigment-based black ink containing water, a self-dispersible black pigment, and a water-soluble solvent; and
   a dye-based yellow ink containing water, a first water-soluble dye in which a number of counter ion or ions per one molecule is not more than 3, and a second water-soluble dye in which a number of counter ion or ions per one molecule is not more than 3 and which has a hue angle h* different from a hue angle h* of the first water-soluble dye by not less than 50°, wherein:

a weight ratio of the second water-soluble dye to the first water-soluble dye in the dye-based yellow ink is 0.3 to 5.5%; and a total content of the first and second water-soluble dyes in the dye-based yellow ink is 1.8 to 5.5% by weight.

8. The ink set for ink-jet recording according to claim 7, wherein the hue angle h in the first water-soluble dye is 95° to 105°.

9. The ink set for ink-jet recording according to claim 7, wherein a value of a lightness L* is $84 \leq L^* \leq 90$ and a value of the hue angle h* is $85° \leq h^* \leq 95°$ in the dye-based yellow ink.

10. The ink set for ink-jet recording according to claim 7, wherein in the dye-based yellow ink, the hue angle h* of the second water-soluble dye is different from the hue angle h* of the first water-soluble dye by not less than 90°, and the weight ratio of the second water-soluble dye to the first water-soluble dye is 0.3 to 3.5%.

11. The ink set for ink-jet recording according to claim 10, wherein a value of a lightness L* is $84 \leq L^* \leq 90$ and a value of the hue angle h* is $85° \leq h^* \leq 95°$ in the dye-based yellow ink.

* * * * *